No. 621,656. Patented Mar. 21, 1899.
T. U. GRAY & F. BASS.
ROTARY MOTOR.
(Application filed Sept. 19, 1898.)
(No Model.) 6 Sheets—Sheet 1.
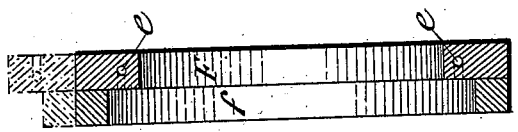
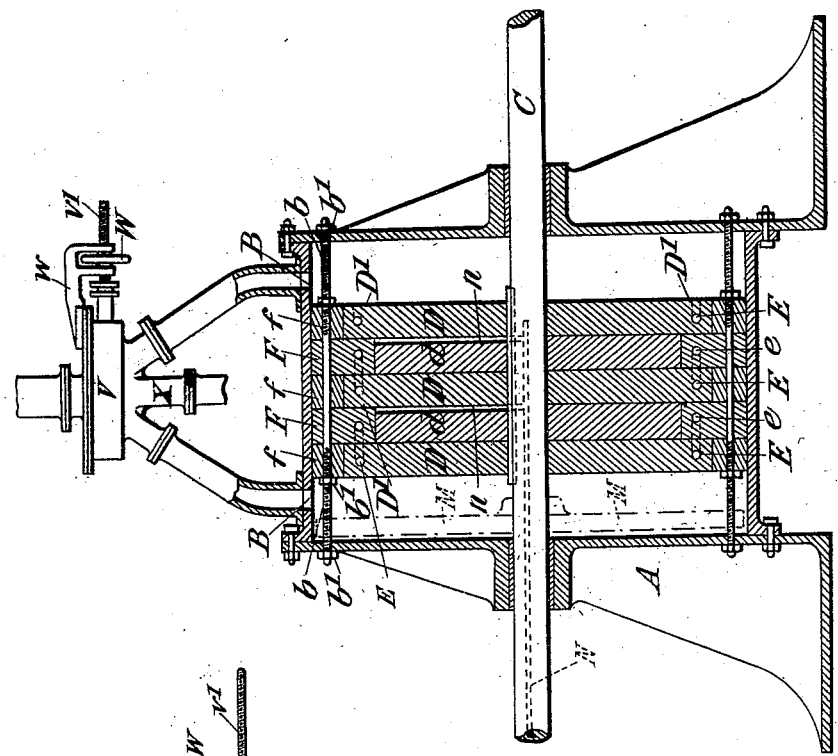
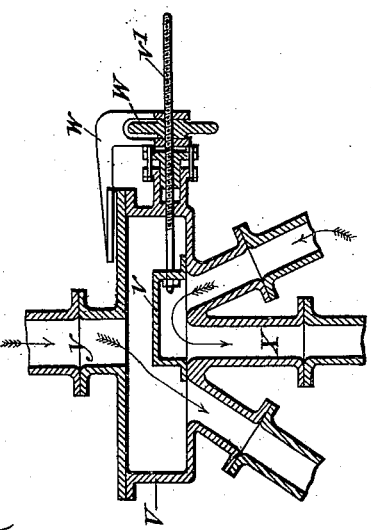
Witnesses
Inventors
Thomas U. Gray
Frederick Bass
By James L. Norris
Atty No. 621,656. Patented Mar. 21, 1899.
T. U. GRAY & F. BASS.
ROTARY MOTOR.
(Application filed Sept. 19, 1898.)
(No Model.) 6 Sheets—Sheet 2.
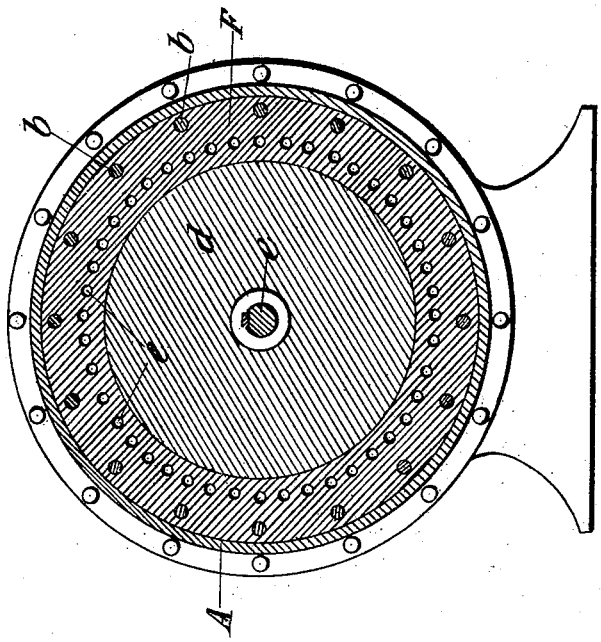
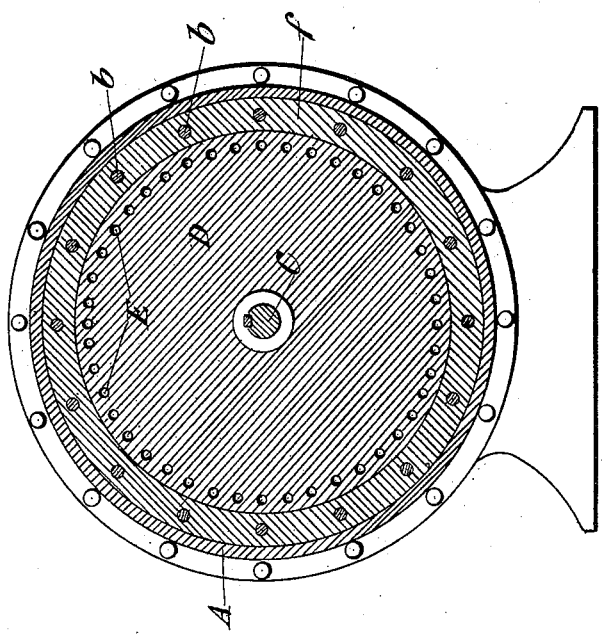
Witnesses
Inventors
Thomas U. Gray
Frederick Bass
By James L. Norris
Atty

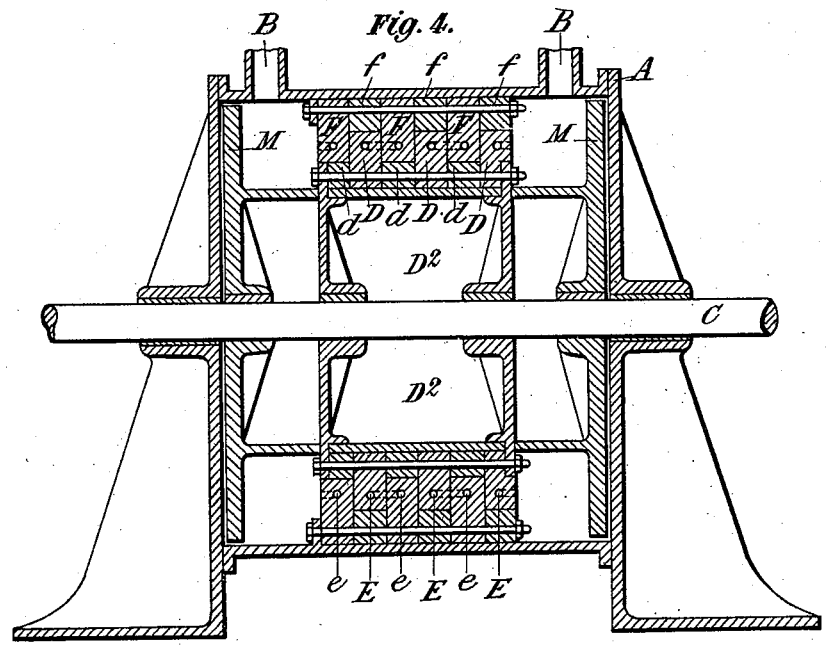
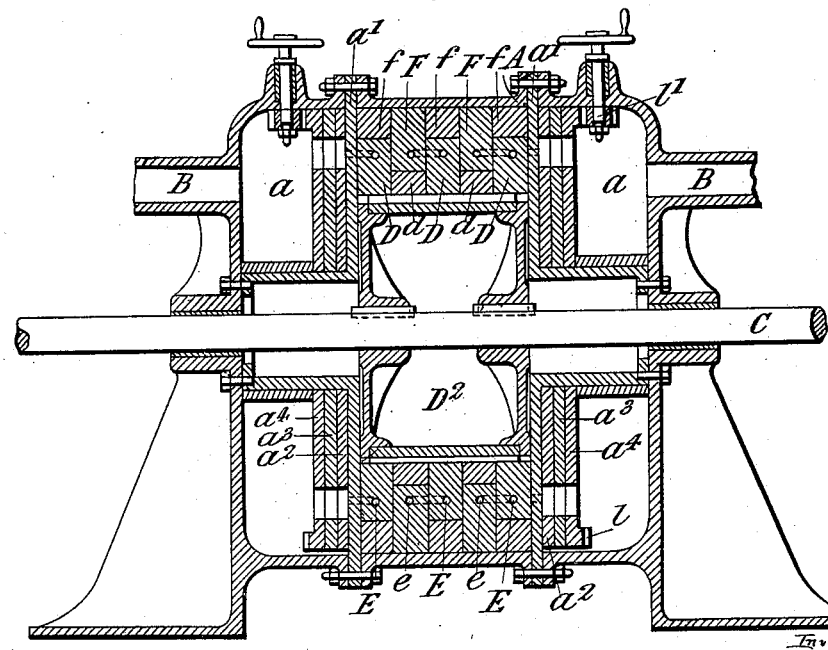

No. 621,656. Patented Mar. 21, 1899.
T. U. GRAY & F. BASS.
ROTARY MOTOR.
(Application filed Sept. 19, 1898.)
(No Model.) 6 Sheets—Sheet 4.

No. 621,656. Patented Mar. 21, 1899.
T. U. GRAY & F. BASS.
ROTARY MOTOR.
(Application filed Sept. 19, 1898.)

(No Model.) 6 Sheets—Sheet 5.

Witnesses
Inventors
Thomas U. Gray
Frederick Bass
By James L. Norris
Atty

No. 621,656. Patented Mar. 21, 1899.
T. U. GRAY & F. BASS.
ROTARY MOTOR.
(Application filed Sept. 19, 1898.)
(No Model.) 6 Sheets—Sheet 6.
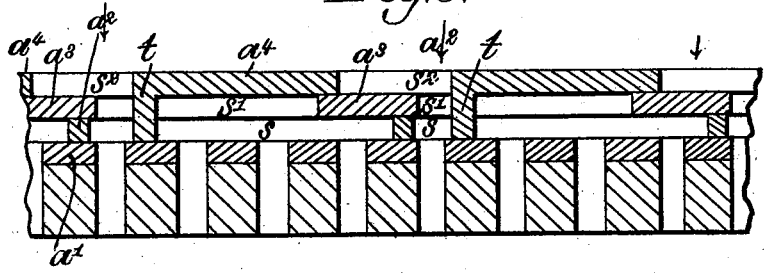
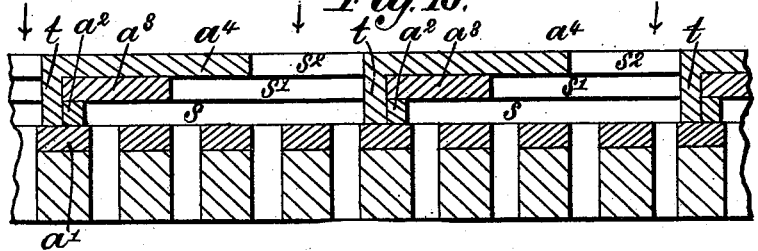
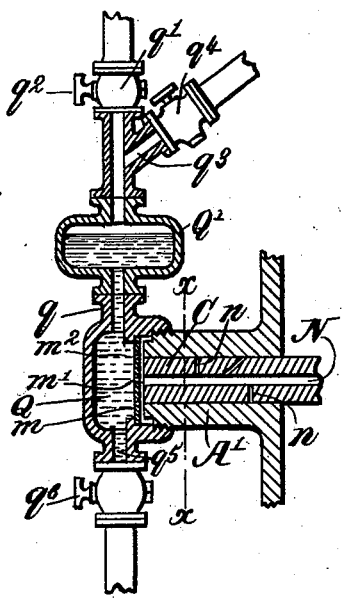
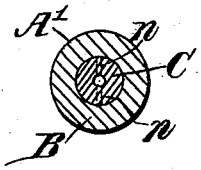
Witnesses.
Robert Everett
Inventors.
Thomas U. Gray,
Frederick Bass.
By James L. Norris
Att'y

UNITED STATES PATENT OFFICE.

THOMAS UNDERWOOD GRAY AND FREDERICK BASS, OF LONDON, ENGLAND.

ROTARY MOTOR.

SPECIFICATION forming part of Letters Patent No. 621,656, dated March 21, 1899.

Application filed September 19, 1898. Serial No. 691,348. (No model.)

*To all whom it may concern:*

Be it known that we, THOMAS UNDERWOOD GRAY, physician and surgeon, residing at 340 Essex road, and FREDERICK BASS, ophthalmic surgeon, residing at 9 Upper Wimpole street, London, England, subjects of the Queen of Great Britain, have invented certain new and useful Improvements in Rotary Motors, of which the following is a specification.

Our invention relates to a rotary motor or turbine which is adapted to be actuated by fluid pressure, such as steam or water, and is so constructed that its action is capable of being readily reversed and that the use of pistons, vanes, buckets, and similar contrivances that are common to rotary motors and turbines can be dispensed with.

In order that our invention may be clearly understood and readily carried into effect, we will now proceed to describe the same fully with reference to the accompanying drawings, in which—

Figure 7:
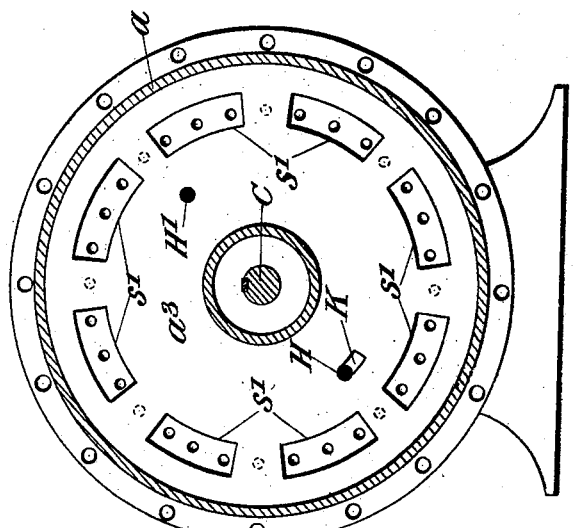
Figure 6:
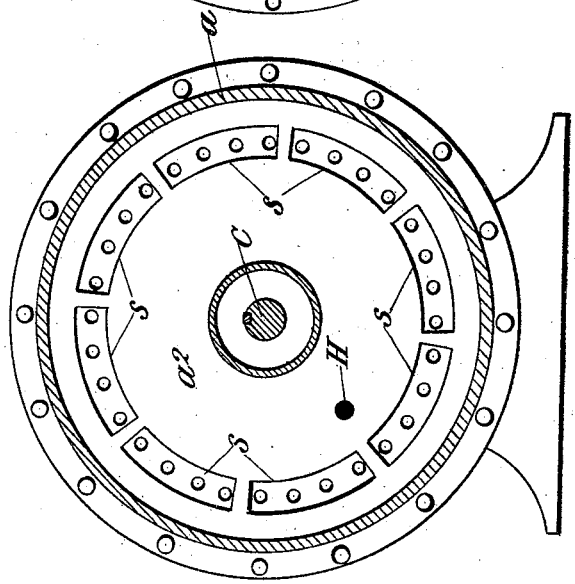
Figure 8:
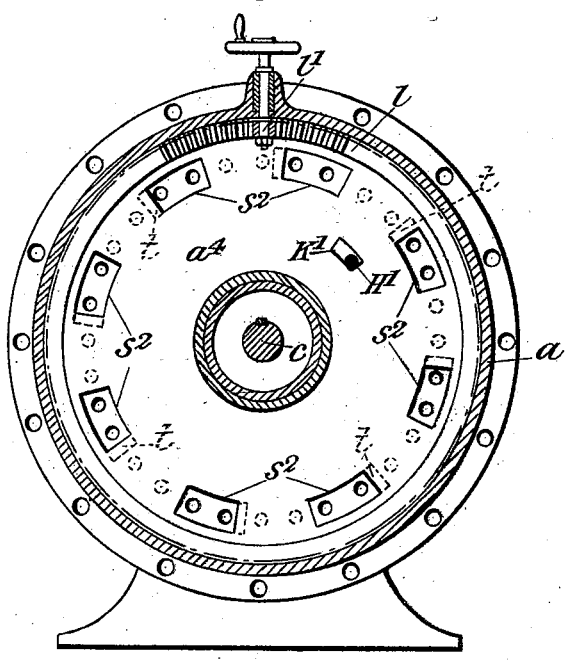

Figure 1 is a side elevation, partly in section, of one form of engine made according to our invention. Fig. 1$^a$ is a sectional view of the fluid-distribution valve shown in Fig. 1. Fig. 1$^b$ is a section through a single pair of rings, showing the direction of the channels. Fig. 2 is a cross-sectional view of the engine shown in Fig. 1, facing one of the larger perforated disks. Fig. 3 is a cross-sectional view of the engine shown in Fig. 1, facing one of the smaller disks. Figs. 4 and 5 are sectional side elevations of modified forms of our engine. Fig. 6 is a sectional end view of the engine shown in Fig. 5, facing the disk $a^2$. Fig. 7 is a sectional end view of the engine shown in Fig. 5, facing the disk $a^3$. Fig. 8 is a sectional end view of the engine shown in Fig. 5, facing the disk $a^4$. Figs. 9 and 10 are sectional views showing the action of the regulating-disks $a^2$ $a^3$ $a^4$. Fig. 11 is a longitudinal section of a part of the engine-shaft and its bearings fitted with a lubricating apparatus. Fig. 12 is a cross-section on line $x$ $x$, Fig. 11.

The fundamental type of our improved rotary motor or turbine comprises a cylindrical chamber A, having an opening B near each of its ends for the entry and exit, respectively, of the actuating fluid, the direction of the flow of which from one opening to the other is capable of being reversed by suitable mechanism, such as valves or taps arranged in the course of the power supplied. Such valve may conveniently consist of a valve-box V, containing a slide-valve $v$, attached to the end of a screw-rod $v'$, which passes through a suitable stuffing-box and is operated by means of a hand-wheel W, mounted in a stationary bracket $w$. This valve opens one of the cylinder-ports to the exhaust X, while the other is in communication with the fluid-supply pipe $y$, and it is obvious that by shifting the position of the valve by means of the hand-wheel the direction of the flow of the actuating fluid through the engine, and consequently the engine itself, can be reversed.

Through the cylindrical chamber A there passes a central longitudinal shaft C, which has keyed to it, within the cylinder, a series of disks D and $d$, arranged in contact and concentrically with one another and with the shaft C. The disks $d$ are of less diameter than the disks D, with which they are arranged to alternate, so that the peripheries of the larger disks project beyond those of the smaller disks and form the projections D'. These projections D' are perforated transversely with one or more series of tubular channels E, such series being arranged circularly and concentrically with the axis of the shaft C. Only one such series is shown in the drawings throughout. All of the channels of each series have the same inclination to the plane of the disk and its radius and all the apertures or extremities of the channels in each series on each side of the disk are arranged concentrically, and with respect to series the extremities of these channels are either at the same radial distance from the central shaft on both sides of the disk or their extremities at one side of the disk may be at greater radial distance than their extremities at the opposite side of the disk. The longitudinal axis of each of the tubular channels is preferably but not necessarily straight. The inner surface or wall of the said cylindrical chamber A is furnished with a series of annular projections or projecting rings F and $f$, corresponding to and somewhat closely adapted to the peripheries of the disks $d$ and D, respectively. The rings $f$, which correspond with and encircle the larger disks D, are imperforate; but the rings F, which correspond with and encircle the disks $d$, are furnished with transverse tubular channels $e$. These channels $e$ are so arranged that they connect and are set at an angle to the channels E, so that during the working of the motor the passages $e$ and E coincide at intervals as the shaft C rotates.

If the longitudinal axes of the channels E are arranged perpendicularly to the plane of the disk, the channels $e$ must be arranged at an angle to the plane of the rings F, or vice versa, or the channels E and $e$ may both be set at an angle to the plane of the disks and rings, respectively. In all cases, however, the channels E must be arranged at an angle to the channels $e$.

The rings F and $f$ may be conveniently formed by a series of rings bolted to each other and to the cylinder by means of screw-bolts $b$ and nuts $b'$. The number, dimensions, and amount of mutual overlapping of the disks D $d$ and rings F $f$ and the number of series of channels and the angular relation of the same depend upon the purpose for which any particular motor is designed. For convenience of construction these disks may, if preferred, be respectively made in pairs, (a large and small disk or a large and a small ring in each pair,) or the rings may be made in halves and bolted up, so that one half may be fixed in the cylinder and then the other half of the rings put in position. In this case the cylinder would also be cast or made in halves, so that in putting the machine together the pairs of disks and rings may be inserted into the cylinder alternately.

When the disks and the rings are properly keyed and bolted, respectively, and the cylinder-heads closed and fastened, it will be readily understood that when the actuating fluid under pressure is admitted to one end of the cylindrical chamber it will in its passage through the inclined tubular channels of the rings and axial disks cause the longitudinal shaft to revolve.

When the rotary motor or turbine is in operation, a suitable lubricant may be forced under pressure into the cylinder, as hereinafter set forth.

If required, we may diminish end thrust on the cylinder-head by keying to the shaft C a disk or disks M, Figs. 1 and 4, without perforations or channels and situated so that the steam or other actuating fluid entering by one of the apertures B passes between it and the first disk of the system, the thrust being taken in great part by this imperforate disk instead of by the head of the cylinder.

It may be advisable in order to lessen the weight of the engine to remove the central portion of all the disks D $d$ and mount them in ring form on a hollow drum $D^2$, Fig. 4, by keys or bolts or other convenient means, the drum $D^2$ being keyed to the shaft C. For convenience of construction in this case it is best for the cylinder and rings to be made in two halves. The imperforate disks M M to reduce end thrust on the cylinder-heads may also be mounted on the drum in a similar way.

In order to effect economy, the admission of the fluid to the tubular channels may be regulated. As turbines are more effective if actuated by fluid at high pressure, it is advisable to be able to admit the actuating fluid at full pressure to a portion of the steam-channels rather than at a lower pressure to the whole of them. This may be done by the following method, which makes use of the expansive power of the steam to the utmost and does away to a great extent with the use of further cylinders for expansion: In the construction shown in section in Fig. 5, $a$ $a$ are annular chambers formed in two parts bolted to the cylinder or case A and carrying the shaft-bearings. These chambers are turned flat and true inside and out and the fixed plates $a'$ now forming the heads of the cylinder or case A are each provided with a ring of tubular apertures corresponding in number and size and being of the necessary angle to the tubular channels in the rings F and disks D.

$a^2$ is a disk, shown in plan in Fig. 6, where $s$ are radial slots cut in the disk and of such relative size and shape that when the disk $a^2$ is in position four tubular apertures in the annular plate $a'$ are exposed by each slot $s$. This disk $a^2$ is fixed to the annular chamber and has a stud or screw H projecting on its outer surface or on that side away from the plate $a'$.

A rotary disk $a^3$, which is shown in plan in Fig. 7, has radial slots $s'$ cut therein, each of such relative size and shape as to be capable of exposing three of the channels in the plate $a'$ when in position. When this disk is placed in position, the stud H of the disk $a^2$ is received in a slot K, cut in the disk $a^3$. On its outer side this disk $a^3$ has a projecting stud or screw H'.

$a^4$ is a rotary disk, shown in plan in Fig. 8, where $s^2$ are radial slots each of such size and shape as to be capable of exposing two of the channels in the plate $a'$. When the disk $a^4$ is placed in position, as shown, the stud H' of disk $a^3$ is received in a slot K' in this disk. On this disk there is an annular projection $l$, which is toothed and forms a rack with which the pinion $l'$ gears. This pinion can be rotated by means of its spindle and a suitable hand-wheel or its equivalent from the outside of the annular chamber $a$. When the pinion $l'$ is rotated, it actuates the rack $l$ and rotates the disk $a^4$ around its center till the stud H' in disk $a^3$ reaches the end of the slot K'. Then if the pinion be further rotated the disk $a^3$ is also carried round in the same direction until the stud H of the fixed disk $a^2$ reaches the end of its slot K, when no further movement in that direction can take place. The relative positions now assumed by these regulating-disks are shown in section in Fig. 9. When the pinion $l'$ is rotated in the reverse direction, the regulating-disks will also be moved in the reverse direction and assume the position shown in Fig. 10. The effect of this is in the one movement to bring the intervening bridges or solid pieces between the slots over part or parts of the subjacent slots and cover them to a greater or less degree, according to the degree of rotation of the disk, while in the reverse movement the slots are opened up and free access to the tubular channels permitted.

On the under surface of regulating-disk $a^4$, Fig. 8—i. e., on the surface toward the turbine—and at the points indicated by dotted lines at one end of the bridges between the slots there are rectangular pieces or tongues $t$, projecting toward the turbine. These rectangular pieces $t$ pass through the slots $s'$ and $s$ and bear on the plate $a'$, and their edges bear on the sides of the slots $s'$ and $s$ in the disks $a^3$ $a^2$, as shown in Figs. 9 and 10.

When the pinion $l'$ has moved the disks the proper distance in the one direction, the bridges, as hereinbefore mentioned, will present the relationship to each other shown in section in Fig. 10, and if in the opposite direction that shown in Fig. 9. It will be seen in Fig. 10 that actuating fluid moving in the direction of the arrows has free access to all the tubular apertures, as shown in the plate $a'$, while when the pinion has moved the regulating-disks to their limits and the position and relationship of the bridges is as shown in Fig. 9 every three of the tubular channels are occluded and only every fourth channel open to the actuating fluid. This action occurs at each set of the bridges, and according to the rotation of the pinion one, two, or three channels may be occluded, while the fluid is admitted by three, two, or one tubular channel left free, or when the pinion is at zero fluid is admitted by all the channels. At starting, therefore, when inertia has to be overcome all the channels are available, and when the momentum is once obtained fluid at high pressure can be admitted to just so many tubular channels as are required in a fashion similar to what is known as "notching up" on a locomotive.

The number of bridges, slots, and regulating-disks may be varied according to requirements.

We find that ordinary methods of lubricating are not satisfactory for the revolving shaft C, as owing to centrifugal action there is a tendency to force the lubricant out of the bearing. We have therefore devised the following means for making use of the said centrifugal force to assist in supplying the lubricant to the bearing, while at the same time supplying the necessary lubricant under pressure to the joints between the rotary disks and stationary rings:

Referring to Figs. 11 and 12, the end of the shaft C, carried by its bearing in the boss A', has a central longitudinal duct or passage N formed therein, which communicates, by means of branch passages $n$, with the bearing. To the end of the boss A' is attached a lubricant-chamber Q, which communicates, by means of a passage $q$, with an upper chamber Q', the top of which is provided with an oil-inlet $q'$, governed by a tap $q^2$, and a steam-inlet $q^3$, governed by a valve $q^4$. The bottom of the chamber Q is provided with an outlet $q^5$, furnished with a tap $q^6$. Fixed in the chamber Q, so as to face the end of the shaft C, we may place a plate $m$, in which is a central perforation or opening $m'$, which permits lubricant to pass into the duct N. In this plate are also a series of smaller perforations $m^2$ to allow waste or excess lubricant to pass back from the bearing into the chamber Q, or this plate $m$ may be omitted. The lubricant is preferably maintained up to a point in the chamber Q' indicated by the dotted line. As the shaft C rotates the centrifugal force causes the lubricant to flow outwardly through the branch passages or ducts $n$ into the bearing with a force approximately proportional to the speed, and so insures the bearing or joint being kept properly lubricated.

In order to supply lubricant under pressure to the working cylinder of the motor to lubricate the joints between the revolving disks and stationary rings, the central passage or duct N is prolonged and branch passages led from it to the said joints, as shown in dotted lines in Fig. 1. In this case the necessary steam-pressure upon the lubricant is obtained by opening the valve $q^4$ and admitting steam from any suitable source of supply to the chamber Q'. By this means a film of lubricant is formed between the surfaces of the revolving disks and stationary rings even under very high pressures, so as to form an efficient steam-tight packing with perfect lubrication.

By means of opening the steam-valve $q^4$ and the tap $q^6$ together and closing the oil-tap $q^2$ the bearing may be thoroughly cleansed by blowing steam therethrough.

What we claim is—

1. In a rotary motor the combination with the fixed cylinder or case and the rotary shaft, of a series of transversely-perforated disks fixed to the said shaft, a series of imperforate disks of lesser diameter also fixed to said shaft so as to alternate and be in contact with the said perforated disks, a series of transversely-perforated rings secured to the cylinder and surrounding said imperforate disks, the perforations in said rings coöperating with, but extending at an angle to, the perforations in said perforated disks, and imperforate rings also secured to said cylinder and surrounding said transversely-perforated disks, the opposing faces of said rings and disks being at all times in immediate contact with each other, substantially as described and for the purpose specified.

2. In a rotary motor the combination with the fixed cylinder or case; of a rotary shaft provided with internal ducts for lubricating the motor, a series of transversely-perforated disks fixed to said shaft, a series of imperforate disks of lesser diameter also fixed to said shaft so as to alternate and be in contact with the said perforated disks, a series of alternately-perforated and imperforate rings fixed in the cylinder or case and in operative connection with the said rotary disks, the said rings and disks having their opposing surfaces at all times in immediate contact with each other, means for reversing the motor, and means for regulating the admission of the actuating fluid thereto, substantially as described and for the purpose specified.

3. In a rotary motor, the combination of co-operating rings and disks having perforations therein through which the actuating fluid passes, a plurality of movable disks each having slots therein, the slots in one of said disks adapted to leave uncovered a certain number of said perforations, and the slots in the other of said disks adapted to leave uncovered a different number of said perforations, and means for moving said disks whereby, when in one position, a certain number of said perforations will be exposed, and when in another position, a different number of perforations will be exposed.

4. In a rotary motor, the combination of co-operating rings and disks having perforations therein through which the actuating fluid passes, the stationary disk $a^2$ having radial slots therein, each adapted to expose four of said perforations, the movable disk $a^3$ having radial slots therein each adapted to expose three of said perforations, the movable disk $a^4$ having radial slots therein each adapted to expose two of said perforations, and slot-and-pin connections between said disks $a^2$, $a^3$, and $a^4$, whereby the disks $a^3$ and $a^4$ may be moved relatively to the disk $a^2$ for admitting the actuating fluid through one, two three or all of the perforations which are exposed by each of the slots in the disk $a^2$.

5. In a rotary motor, the combination of co-operating rings and disks having perforations therein through which the actuating fluid passes, the stationary disk $a^2$ having radial slots therein, each adapted to expose four of said perforations, the movable disk $a^3$ having radial slots therein each adapted to expose three of said perforations, the movable disk $a^4$ having radial slots therein each adapted to expose two of said perforations, and having the bridges $t$ adapted to fit within the slots in the disks $a^2$ and $a^3$, and slot-and-pin connection between said disks $a^2$, $a^3$ and $a^4$, whereby the disks $a^3$ and $a^4$ may be moved relatively to the disk $a^2$ for admitting fluid through one, two, three or all of the perforations which are exposed by each of the slots in the disk $a^2$.

6. In a rotary motor the combination with the fixed cylinder or case; of a rotary shaft provided with internal ducts for lubricating the motor, a series of transversely-perforated disks fixed to said shaft, a series of imperforate disks of lesser diameter also fixed to said shaft, a series of alternately-perforated and imperforate rings fixed to the said case, fixed perforated disks the perforations in which are in operative connection with the perforations in the said disks and rings, fixed slotted plates in contact with said fixed disks, series of superposed slotted plates capable of being shifted so as to control the admission of the actuating fluid to a greater or less number of perforations in the said fixed perforated disks, means for shifting the said slotted plates, means for reversing and means for supplying lubricant to the motor, substantially as described and for the purpose specified.

7. A rotary motor consisting in a cylinder or case A; ports B B in said cylinder; a slide-valve V for connecting one of the said ports to the actuating-fluid pipe Y while opening the other of said ports to the exhaust-pipe X; the imperforate rings $f$ fixed to the said cylinder or case; the rings F having perforations $e$ and also fixed to said cylinder or case; the central rotary shaft C journaled in the cylinder or case and provided with a central lubricating-duct N and branch ducts $n$; the imperforate disks $d$ fixed to the shaft C; the disks D fixed to the shafts C and provided with the perforations E; and the end pressure-plates M; the various parts being arranged, constructed and operating so that the rotary shaft may be driven continuously in either direction as the actuating fluid is admitted to one or other end of the cylinder while the opposite end thereof is open to the exhaust; substantially as described.

8. A rotary motor consisting in a cylinder or case A; ports B B in said cylinder; a slide-valve V for connecting one of the said ports to the actuating-fluid pipe Y while opening the other of said ports to the exhaust-pipe X; the imperforate rings $f$ fixed to the cylinder; the rings F having perforations $e$ and also fixed to said cylinder; the central rotary shaft C journaled in the cylinder or case and provided with a central lubricating-duct N and branch ducts $n$; the imperforate disks $d$ fixed to the shaft C; the disks D fixed to the shaft C and provided with perforations E; and the fixed plates $a'$ each provided with a series of channels or perforations corresponding to the perforations $e$ and E; substantially as described and for the purpose specified.

9. A rotary motor consisting in a cylinder or case A; ports B B in said cylinder; a slide-valve V for connecting one of said ports to the actuating-fluid pipe Y while opening the other of said ports to the exhaust-pipe X; the imperforate rings $f$ fixed to the cylinder; the rings F having perforations $e$ and also fixed to said cylinder; the central rotary shaft C journaled in the cylinder or case and provided with a central lubricating-duct N and branch ducts $n$; the imperforate disks $d$ fixed to the shaft C; the disks D fixed to the shaft C and provided with perforations E; the fixed plates $a'$ each provided with a series of channels or perforations corresponding to the perforations $e$ and $E$; the fixed disks $a^2$ respectively placed in contact with the plates $a'$ and each provided with a stud H and slots $s$ each of which is capable of exposing four perforations in the plate $a'$; the rotary disks $a^3$ respectively placed in contact with the plates $a^2$ and each provided with a slot K (to receive a stud H) a stud H', and slots $s'$ each of which is capable of exposing three perforations in the plate $a'$; the rotary disks $a^4$ respectively placed in contact with the plates $a^3$ and each provided with a slot K' (to receive a stud H'), slots $s^2$ each capable of exposing two of the perforations in the plate $a'$, rectangular pieces $t$ projecting through the slots $s'$ and $s$ and bearing on the plates $a'$, and a circular toothed rack $l$; and the pinion $l'$ attached to a spindle operated by a hand-wheel for shifting the disks $a^3$ and $a^4$ to regulate the supply of actuating fluid to the motor; substantially as described and for the purpose specified.

10. In a rotary motor, the combination with the cylinder or case, the inlet and exhaust ports, the fixed imperforate and perforated rings, the rotary imperforate and perforated disks, and the rotary shaft provided with longitudinal and branch lubricating-ducts, of a lower lubricant-chamber Q attached to the bearing-boss A', an outlet $q^5$ from said chamber Q controlled by a valve $q^6$, an upper lubricant-chamber Q', an oil-inlet $q'$ fitted with a valve and communicating with the chamber Q', a steam-inlet $q^3$ fitted with a valve and communicating with the chamber Q', a passage $q$ connecting the chamber Q and Q', and a plate $m$ fixed in the chamber Q and provided with a central passage $m'$ and a series of smaller passages $m^2$, substantially as described and for the purpose specified.

In testimony whereof we have hereunto set our hands, in presence of two subscribing witnesses, this 7th day of September, 1898.

THOMAS UNDERWOOD GRAY.
FREDERICK BASS.

Witnesses:
ARTHUR JOHN VERE BASS,
G. F. WARREN.